Jan. 19, 1965  SHIGEAKI SUGANO ETAL  3,165,997
DIAPHRAGM DEVICE FOR SINGLE LENS REFLEX CAMERA
Filed Aug. 18, 1961  6 Sheets-Sheet 1
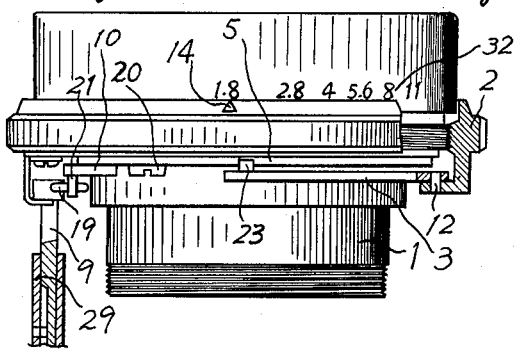
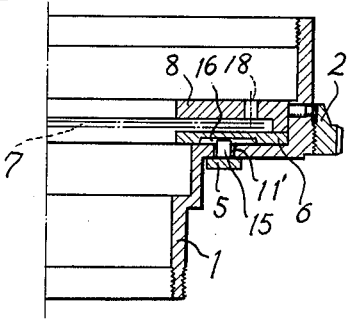
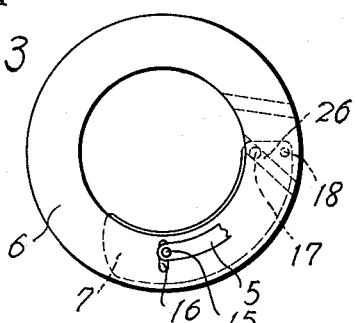
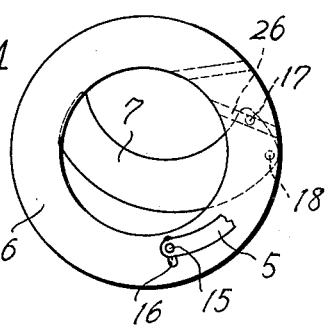
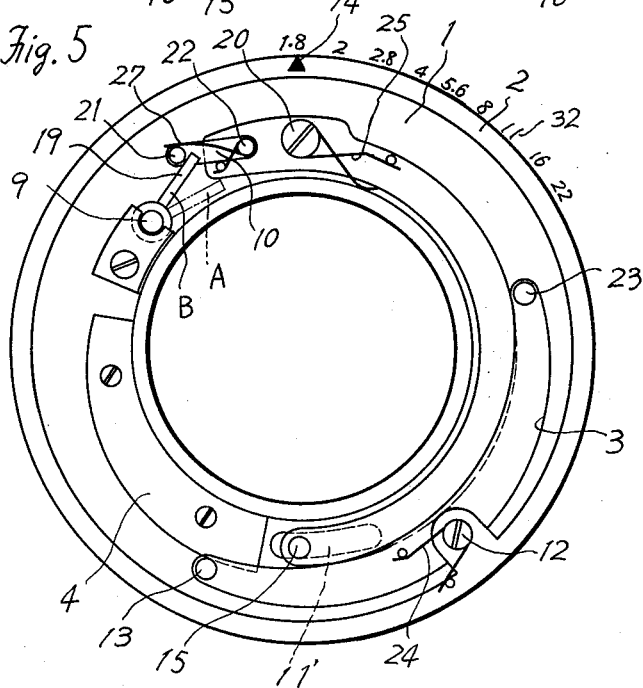

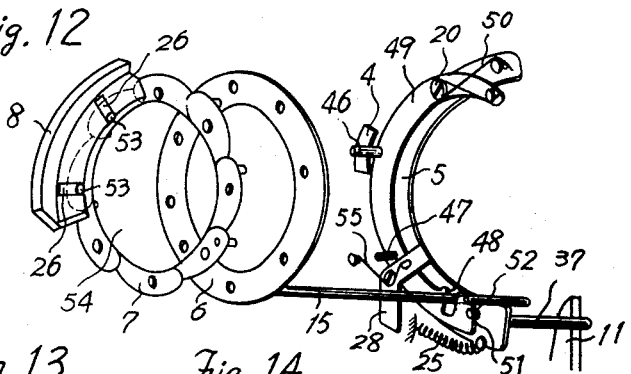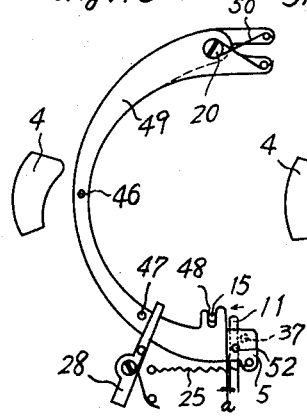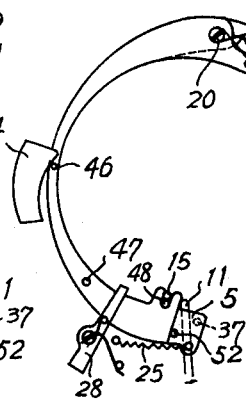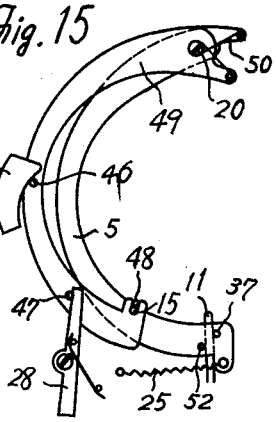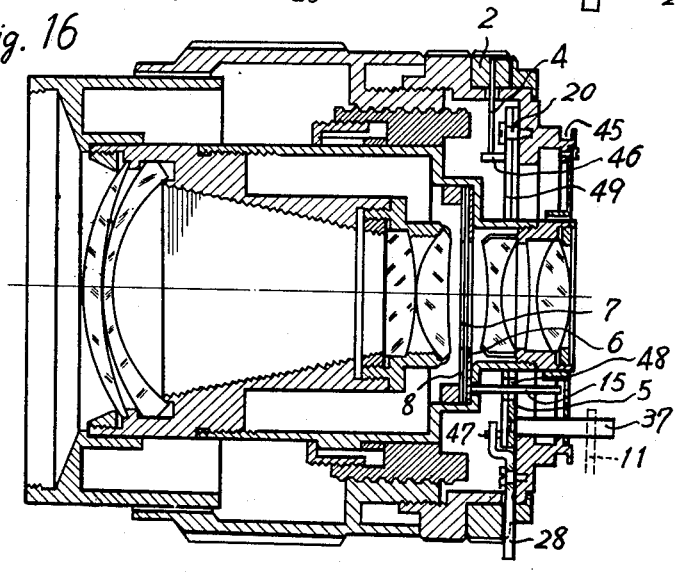

Jan. 19, 1965   SHIGEAKI SUGANO ETAL   3,165,997
DIAPHRAGM DEVICE FOR SINGLE LENS REFLEX CAMERA
Filed Aug. 18, 1961   6 Sheets-Sheet 5

United States Patent Office 3,165,997
Patented Jan. 19, 1965

3,165,997
DIAPHRAGM DEVICE FOR SINGLE LENS
REFLEX CAMERA
Shigeaki Sugano, Sumiyoshi-ku, Osaka, and Osamu Tanizaki, Sakai, Japan, assignors to Minolta Camera Kabushiki Kaisha, a corporation of Japan
Filed Aug. 18, 1961, Ser. No. 132,395
Claims priority, application Japan, Aug. 30, 1960, 35/36,581/60
4 Claims. (Cl. 95—64)

This invention relates to a diaphragm device for a single lens reflex camera, which is simple in both construction and operation as well as capable of assembling without any excessive enlargement in volume of a diaphragm mechanism.

Conventional diaphragm mechanisms for a single lens or monocular reflex camera have been provided with rotatable annular members for interlocking a part of the camera and diaphragm blades. In a diaphragm mechanism of such a type, since loss of energy due to the friction and inertia is high, numerous bearing balls were required in order to avoid friction; however, such ball bearings cause accidents of the diaphragm mechanism due to increase of inertia.

The present invention is, therefore, contemplated to eliminate such defect as referred to above. A further object of this invention is to provide such a diaphragm means as easily operable due to simple construction; accordingly, the required size and numbers of parts of the diaphragm mechanism may be reduced by efficiently displacing the diaphragm actuating lever from its center, following the rotation of cam plates and diaphragm controlling rings, against a semicircular outer peripheral face of the diaphragm actuating lever and simultaneously by performing such movement along the outer periphery of lens frames.

Another object of the present invention is to provide a preset type diaphragm device which is applicable to a lens cylinder being in turn a large spare lens, etc. adapted to perform a smooth movement of a diaphragm lever without any obstruction and adapted to contain all the parts of a shutter mechanism in a lens cylinder.

A further object of this invention is to provide a diaphragm device, wherein the opening and closing of diaphragm blades are operated smoothly and quickly, because all parts of the diaphragm actuating mechanism are adapted to operate by a lever motion or spring force instead of frictional force as is required in conventional diaphragm mechanisms by reciprocating motion of a reciprocating lever. According to this invention, such diaphragms are always in full open condition excepting when a photographing operation is conducted. Thus, diaphragm blades perform an instant closing or opening operation.

Another object of this invention is to provide a diaphragm device adapted to perform a quick operation in reducing the loss of energy due to the friction and inertia down to less than half by increasing the radius of rotation of a well-known diaphragm device approximately twice the usual value by using an arcuate lever instead of an annular member. Another object is to provide a diaphragm mechanism adapted for an easy operation because the essential parts of the mechanism are constructed of punched metal goods available due to the simple construction.

The present invention is described in detail in the following in connection with a few embodiments of this invention. It is, of course, possible to make a number of improvements without departing from the spirit and scope of this invention as set forth in the claims given later. Similar parts are represented by similar numerical symbols, thoroughout the accompanying drawings, in which:

FIG. 1 is a partial sectional plan of the diaphragm means of the present invention;

FIG. 2 is a sectional plan showing the essential parts of said device;

FIGS. 3 and 4 are plan views of the diaphragm blades showing the operational condition of preceding shutter devices;

FIGS. 5 to 7 are front views illustrating operational condition of the preceding devices;

FIG. 12 is an exploded perspective view of a further diaphragm device according to this invention;

FIGS. 13 to 15 are plan views of the essential part of the preceding devices;

FIG. 16 is a detailed set-up sectional view of the preceding device;

Figure 6:
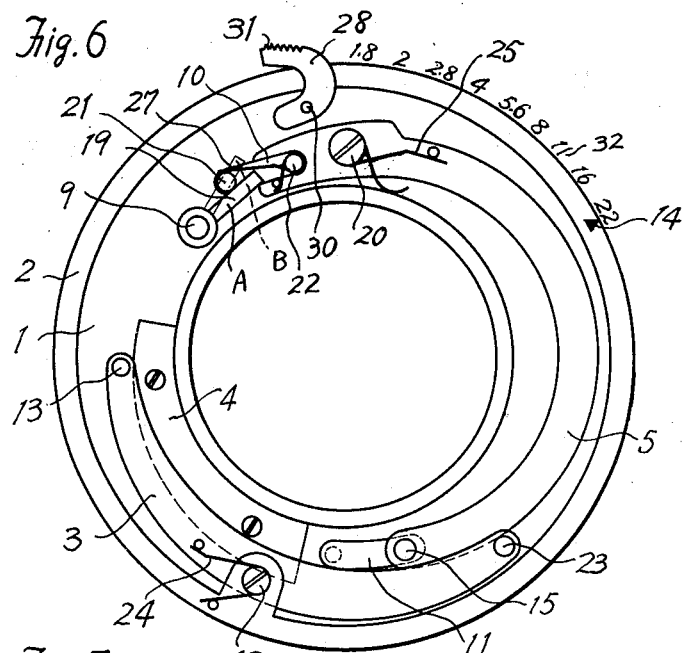
Figure 7:
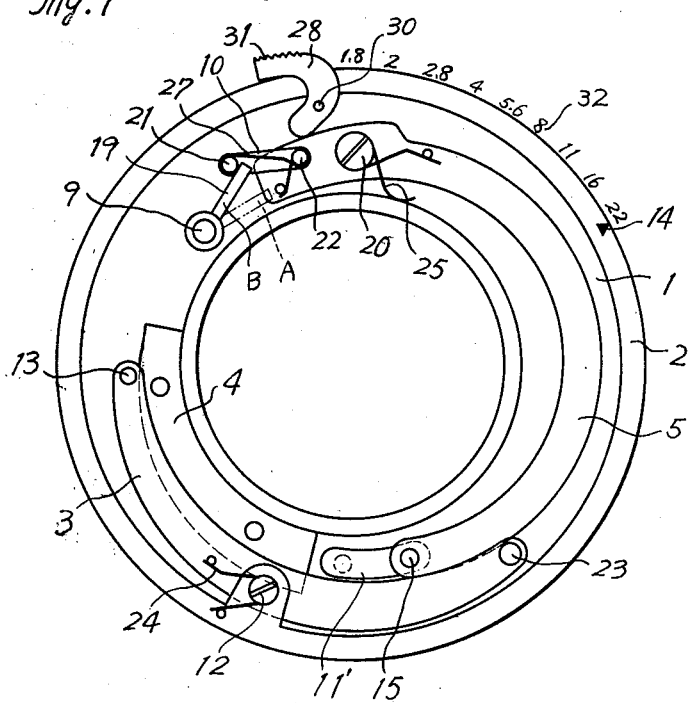

One embodiment of the diaphragm device according to this application is shown in FIGS. 1 through 7 wherein a diaphragm controlling ring 2 is provided as fitted rotatably around the outer periphery of an objective lens frame 1, and an indicia mark 14 is set relative to a scale 32 engraved on the objective lens frame for operation therewith. As is illustrated in FIG. 1 on the inner periphery of the diaphragm controlling ring 2, the central portion of an arcuate diaphragm-controlling lever 3 is pivoted thereon by a pin 12 and extends along the outer periphery of the objective lens frame. The diaphragm controlling lever has a contactor 13 fixed on one end; the contactor 13 is always biased into contact with a peripheral cam plate 4 secured to the objective lens frame 1 illustrated in FIGS. 5 through 7 by means of a spring 24 hung on the pin 12. A limiting piece 23 is secured to the diaphragm controlling lever 3 on the other end thereof has for engagement with the outer periphery of the diaphragm actuating lever 5 which has a semicircular form along the outer periphery of the objective lens frame and which is pivoted thereto about the axis 20.

The diaphragm actuating lever 5, the other end of which is engaged in a groove 16 of the diaphragm actuating ring 6 through the pin 15 as illustrated in FIG. 3, actuates the diaphragm blade 7 by being rotated counterclockwise about the axis 20 to make the diaphragm actuating ring 6 move from the position of FIG. 3 to that of FIG. 4. The diaphragm blade 7 is pivoted on the diaphragm holding ring 8 with a pin 18 and has a rivet 17 slidably disposed in a groove 26 of the diaphragm actuating ring 6 to effect movement from the position of FIGURE 3 to that of FIGURE 4. Further, the pin 15 provided on the other end of the diaphragm actuating lever 5 is designed to be interlocked with the arcuate groove 11' of the objective lens frame 1 and the said diaphragm actuating lever is actuated by the spring 25.

An interlocking shaft 9, adapted to rotate when diaphragm mechanism is charged, is provided as illustrated in FIGURE 1 on the side of a camera body facing towards the head of the diaphragm actuating lever 5. As shown in FIGURE 5, an arm 19 of the interlocking shaft is interlocked to a position-A before charging and to a position-B after charging, and to return to the position-A after releasing. Further, an auxiliary lever 10 provided with a projection 21, the front end of which is in contact with the arm 19 of interlocking shaft 9, is pivoted to the head of the diaphragm actuating lever 5 by a pin 22, while a spring 27 stronger than the spring 25 hung on the diaphragm actuating lever 5 acts on the projection 21 for biasing it into continuous contact with the arm 19. The interlocking shaft 9 is designed to avoid disengagement of the relation with the auxiliary lever 10 by an extendable shaft device 29, even when the lens cylinder makes a helicoidal advance. The upper face of the head portion of the diaphragm actuating lever 5 is disposed adjacent a releasing lever 28 which is pivoted by a pin 30 on the lens frame 1, whereby the diaphragm actuating lever 5 is actuated by pushing down the actuating end 31 of the releasing lever.

When the indicator 14 of the diaphragm controlling ring 2 is set by F:1.8 of the scale, the diaphragm controlling lever 3 is brought together by rotating said diaphragm controlling ring, which results in that the position of the limiting member 23 is set by the peripheral face cam plate 4 coming in contact with the contactor 13 provided on one end of said diaphragm controlling lever, and thus the limiting member comes in contact with lever 5 a little above the center of the outer semicircular periphery of the diaphragm actuating lever 5.

Thus, the diaphragm actuating lever 5 is turned about the axis 20, and the pin 15 at the other end of said diaphragm actuating lever is placed on the other side of the arcuate groove 11. In the position of the pin 15 just referred to, the diaphragm blade 7 opens to the maximum as illustrated in FIG. 3, that is, the diaphragm is full open. In this case, the diaphragm actuating lever 5 does not operate whether the arm 19 of the interlocking shaft 9 may be at position A or B.

When the diaphragm is set for instance by F:22, the diaphragm controlling lever 3 is shifted as shown in FIG. 6 by rotation of the diaphragm controlling ring 2 to shift the limiting position of the limiting piece 23 provided on the other end of a diaphragm controlling lever 3, with respect to the diaphragm actuating lever 5, below said diaphragm actuating lever, thereby permitting an outward movement of said diaphragm actuating lever by means of the spring 25. Therefore, the pin 15 at the lower end of said diaphragm actuating lever allows the diaphragm actuating ring 6 to shift to the position shown in FIG. 4 or FIG. 6, while the diaphragm blade 7 is reduced to F:22. When the diaphragm is charged, the arm 19 of the interlocking shaft 9 is turned from A to B and the diaphragm actuating lever 5 is returned to the position shown in FIG. 5 against the spring 25 through the auxiliary lever 10 on the head of said lever 5, while the diaphragm blade 7 comes to the opened position as illustrated in FIG. 3.

When the diaphragm charger is pushed, the arm 19 of the interlocking shaft 9 is returned from B to A positions. Therefore, the diaphragm actuating lever 5 is moved to the required diaphragm value under the action of the spring 25 as shown in FIG. 6. However, such a movement is performed before the diaphragm begins to open.

Further, in the position shown in FIG. 6, when the diaphragm charger is charged, the diaphragm will open. If however the diaphragm setting is desired to be confirmed or moved to another desired diameter setting, the diaphragm actuating lever 5 will be moved against the spring force of the spring 27 without altering the position of the arm 19 of the interlocking shaft 9 on pushing the releasing lever 28 as in FIG. 7, the diaphragm blade 7 is arbitrarily brought to a desired diaphragm value.

Thus, the present embodiment having said construction may be applied to a single lens reflex camera in the above-described arrangement. Further, following the turning of the cam plate 4 or the diaphragm controlling ring 2, the diaphragm actuating lever 5 may be controlled by displacing the lever 5 to the center of rotation effectively along the outer semi-circular peripheral surface of said diaphragm actuating lever 5 and simultaneously those movements may be performed along the outer periphery of the lens frame body. As a result, the size of the diaphragm mechanism may be reduced and operated easily and advantageously.

Another embodiment of the present type diaphragm mechanism according to this invention is described in connection with FIGS. 8 to 11.

Figure 8:
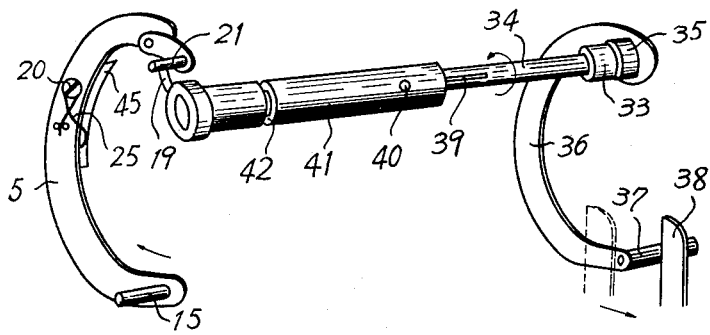
FIG. 8 is an oblique view illustrating the types of diaphragm devices according to this invention.
Figure 9:
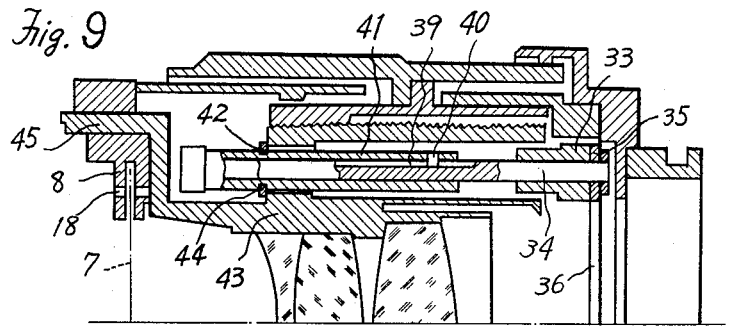
FIG. 9 is a longitudinal side elevation of the preceding devices.
Figure 10:
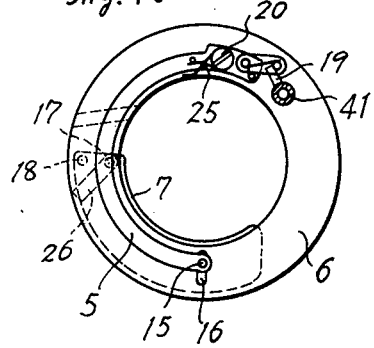
FIGS. 10 and 11 are front elevations illustrating diaphragm operating states of the preceding device.

In FIG. 8, an interlocking lever 36 is secured to the base portion 35 of an actuating shaft 34 which is rotatably fitted to one side of a lens fitting portion 33; an engaging member 37 projecting from the other end of said interlocking lever is then brought opposite a preset lever 38 on the camera body. A key 40 is inserted in a key groove 39 engraved on the driving shaft 34, and an actuating cylinder shaft 41 is disposed on the shaft 34. A peripheral groove 42 on the cylinder shaft 41 is disposed on the shaft 34. A peripheral groove 42 on the cylinder shaft 41 receives an abutment element 44 on an end of a helicoidal cylinder 43. The arm 19 secured at the front end of the actuating cylinder shaft 41 is pivoted with the axis 20 on one side of the diaphragm device portion 45 of the lens cylinder, and the arm 19 is engaged with the projection 21 at the upper end of the diaphragm actuating lever 5 which is made to rotate outwardly of the lens cylinder by virtue of the spring 25. The pin 15 at the lower end of the diaphragm actuating lever 5 is engaged in the groove 16 of the diaphragm actuating ring 6 as illustrated in FIG. 10.

Figure 11:
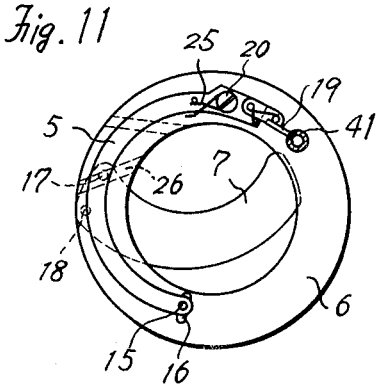

In the above arrangement, when the diaphragm actuating lever 5 is rendered to rotate about the axis 20 outwardly of the lens cylinder, the diaphragm blade 7 operates toward the reduction of diameter of diaphragm aperture with rotation of the diaphragm actuating ring 6 as illustrated in FIG. 11. Namely, the rivet 17 on the diaphragm blade 7 pivoted to the diaphragm pushing ring 8 with the pin 18 is pushed by the diaphragm actuating groove 26 of the diaphragm actuating ring 6, thereby commencing the actuation of said diaphragm blade.

The preset lever 38 is actuated to a true line position shown in FIG. 8 when the diaphragm charger is pushed on one side of the camera body; and when the diaphragm is charged, the preset lever 38 reciprocates along the front wall of the camera body as shown in dotted line. The interlocking lever 36 coming in contact with the preset lever 38 by the engaging piece 37 interlocks with the driving shaft 34 as well as the driving cylindrical shaft 41 as the diaphragm charger is pushed, then holding of the projection 21 is released by the arm 19 provided on said shaft 41, the diaphragm actuating lever 5 is turned outwardly of the lens cylinder by spring force of the spring 25, and the pin 15 of the lower end of said diaphragm actuating lever 5 actuates the diaphragm blade 7 through the diaphragm actuating ring 6. As soon as the diaphragm is charged, the preset lever 38 pushes the interlocking lever 36 which rotates the driving shaft 34 as well as cylindrical shaft 41, and said rotation pushes up the projection 21 at the end of the diaphragm actuating lever through the arm 19 with the diaphragm actuating lever being turned around the axis 20 toward the center of the lens cylinder against the spring force of the spring 25, whereby the diaphragm blade 7 is full-opened.

Thus in the present embodiment of FIGS. 8–11, an interlocking lever 36 in the lens cylinder is connected with the driving shaft 34 through the base portion 35 and lens cylinder affixing portion of said driving shaft 34, and the reciprocating movement of the preset lever on the side of the camera body is converted in a rotation of said driving shaft by bringing the preset lever 38 into engagement with the engaging piece 37 of said interlocking lever; the driving shaft 34 is engaged with the driving cylindrical shaft 41 by the key groove 39 and a key 40, and a part of said driving cylindrical shaft is engaged with a part of the helicoidal cylinder 43. The helicoidal cylinder 43 which operates by the focal adjustment in the lens cylinder brings the driving cylindrical shaft 41 to a to-and-aft movement following the movement of optical axis direction, thereby enabling a smooth interlocking with the diaphragm actuating lever 5 without obstruction. Furthermore, all the equipment parts may be contained within the lens cylinder, which makes the apparatus best adaptable to a lens cylinder having a large spare lens and the like.

A further embodiment of the present invention is illustrated in FIGS. 12 through 21. Referring first to FIGS. 12 through 16, an advancing lever 11 on the side of the camera body has lateral and reciprocal movement with diaphragm operation and is brought in contact with the engaging piece 37 of arc-formed diaphragm actuating lever 5 which is pivoted with an axis 20 to the lens cylinder secured to the body side by means of the engaging portion 45 and which is energized with the spring 25 to rotate clockwise. An arc-formed overlapping lever 49, about the middle portion of which a limiting pin 46 is provided, at the lower end of which a shutter releasing pin 47 is provided, and in one part of which a groove portion 48 is formed, and is coaxially provided with axis 20 on said diaphragm actuating lever 5. The levers 5 and the tail portion of the overlapping lever 49 are embracingly energized with a spring 50; the other end portion 51 of the overlapping lever 49 is brought in contact with a pin 52 secured to the diaphragm actuating lever 5 to constitute a stopper. A limiting pin 46 is brought in contact with the cam plate 4 secured to the diaphragm controlling ring 2, and a diaphragm releasing pin 47 is brought in contact with the rear portion of the diaphragm releasing lever 28 the head of which is protruded outward and pivoted to the lens cylinder. Opposite the stationary side of the diaphragm blade 7, the diaphragm pushing ring 8 is formed with the introducing groove 26 which slidably receives a pin 53; the diaphragm actuating pin 15 which is secured to the diaphragm opening and closing ring 6 actuates the diaphragm blade 7, is clasped in the groove portion 48 of the overlapping lever 49. In this case, said diaphragm actuating pin 15 has a sufficient length as to prevent said pin 15 from detaching even when the helicoid is elongated for focusing.

In the above arrangement, when an index on the diaphragm controlling ring 2, for instance, a symbol 14 as represented in FIG. 1 is set by a desired diaphragm value to halt the cam plate 4 at a regular position shown in FIG. 13 and a push button (not shown) is actuated, the advancing and retreating lever 11 moves in the arrow direction through the related mechanisms. Thus, the diaphragm actuating lever 5, which has been held with the engaging member 37 by the advancing and retreating lever 11, turns anticlockwise around the shaft 20 by being pulled with the spring 25, while the overlapping lever 49 runs together with the diaphragm actuating pin 15 grasped with the groove 48 through the shaft 52 and the diaphragm opening ring 6 secured to said shaft 52; the diaphragm blade 7 having said diaphragm opening ring inserted with the pin 53, which has been so far in a full open position, reduces the aperture of the diaphragms 54 in such a manner that the pin 53 rotates while sliding along the introducing groove 26 of the diaphragm blade pushing ring 8. As is shown in FIG. 14, the limiting pin 46 of the overlapping lever 49 knocks against the cam plate 4 awaiting the lever at a predetermined position and prevented from advancing further; therefore, the hole 54 will stop automatically as it reaches to a desired value. When the advancing and retreating lever 11 returns in the reverse arrow direction after opening to a regular diaphragm aperture, it knocks against the engaging member 37 and brings together the diaphragm actuating lever 5 against the spring force of the spring 25. Therefore, also the overlapping lever 49 returns to the initial position by the action of the spring 50 at the rear portion thereof; thus the diaphragm opening and closing ring 6 causes the diaphragm blade 7 to be returned to its original position through the diaphragm actuating pin 15 held in the groove portion 48 and the diaphragm aperture 54 reaches the original full open condition. Against this full open position, an appropriate stopper is provided on the diaphragm opening ring 6 in order to avoid further rotation. When a clearance is provided as shown in FIG. 13 between the stopping position of the lever 11 and position of the engaging piece 37 at the full open position of diaphragm aperture, the possibility of overcharge is safely absorbed. In addition, mutual exchangeability of related parts is increasing and the tolerance in degree of precision of finished products is enlarged.

In the automatic diaphragm setting operation, when it is desired to investigate the diaphragm opening, the head portion of the diaphragm releasing lever 28, which is protruded out of the lens cylinder, is rotated counterclockwise, and then the rear portion of the diaphragm releasing lever as illustrated in FIG. 15 rotates the overlapping lever 49 by means of the diaphragm releasing pin 47, until the limiting pin 46 strikes against the cam plate 4 to be stopped at the desired diaphragm position; therefore, the diaphragm opening ring 6 rotating together with the diaphragm actuating pin 15 held by the groove portion 48 brings the diaphragm blade 7 to a desired diaphragm aperture. If the diaphragm releasing lever 28 is released, it will return to the initial position by the spring force of the spring 55, and the overlapping lever 49 is also returned to the initial position by the spring 50 together with the diaphragm actuating pin 15 and diaphragm opening ring 6, while the diaphragm aperture 54 reaches a full open condition.

Figure 17:
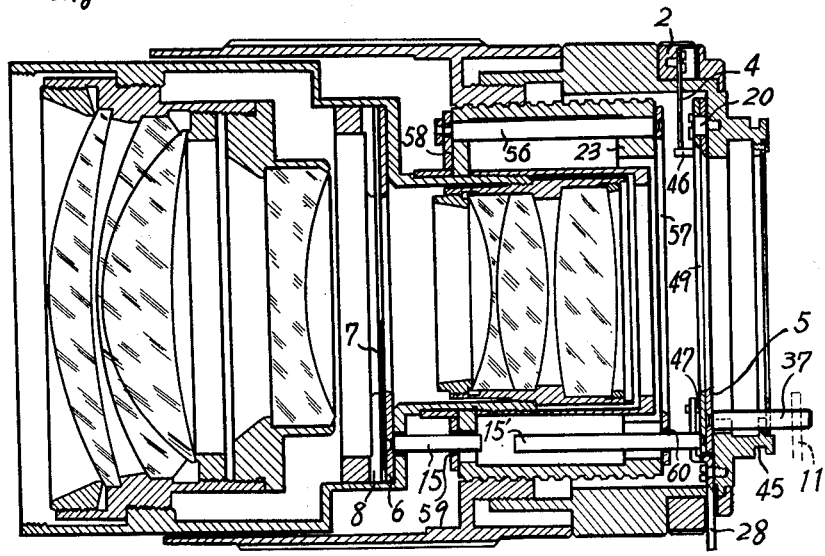
FIG. 17 is a detailed set-up sectional view of the device shown in FIG. 16 with a part thereof being improved.

In the above-mentioned embodiment, wherein the diaphragm blades 7 comes adjacent to the diaphragm actuating lever 5, the diaphragm blade 7 is separated and in front of the diaphragm lever 5 as a telescope lens or a long focal distance lens. As shown in FIG. 17, arcuate levers 57 and 58 operate together and are secured to a supporting rod 56. The rod 56 extends though the inner helicoid cylinder 43 which advances and retreats for focusing, between the diaphragm opening ring 6 and the diaphragm actuating lever 5 that are provided at respective ends of the inner helicoid cylinder 43. The diaphragm actuating pin 15 is divided in two, with one actuating pin 15' secured to the overlapping lever 49; both actuating pins 15 and 15' are engaged respectively in the grooves 59 and 60 of the arcuate levers 57 and 58, and for the stretching-out of the inner helicoidal cylinder 23 due to focusing, the diaphragm actuating pin 15 while sliding along the groove 59 goes in-and out together with the ring 6 in response to the movement of said inner helicoid cylinder. Moreover, the operation of the overlapping lever 49 with respect to the diaphragm action is transmitted to the diaphragm actuating pin 15 by the diaphragm actuating pin 15' through the arcuate lever 57, support 56 and arcuate lever 58, to operate the diaphragm opening ring 6 to perform both automatic diaphragm opening and return action similarly as mentioned above.

Figure 18:
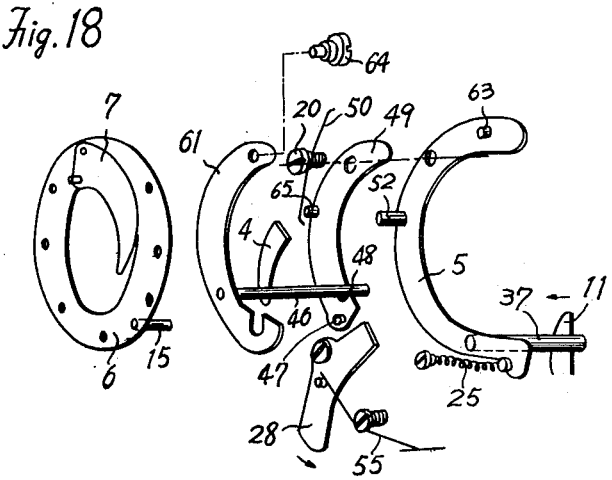
FIG. 18 is an exploded perspective view of a part of the mechanism shown in FIG. 12.

FIG. 18 represents a modification of FIG. 12, wherein an intermediate arcuate lever 61 is provided between the diaphragm opening ring 6 and overlapping lever 49. This intermediate arcuate lever is provided with the limiting pin 46 which is brought in contact with the cam plate 4 and engaged in the groove portion 48 of the overlapping 49. The diaphragm actuating pin 15 is disposed in a groove located adjacent the end of the intermediate lever 61. The modified type of operation is the same as in the case with FIG. 12, said modified form being suitable for a large bore lens having a large diaphragm actuating angle.

Figure 19:
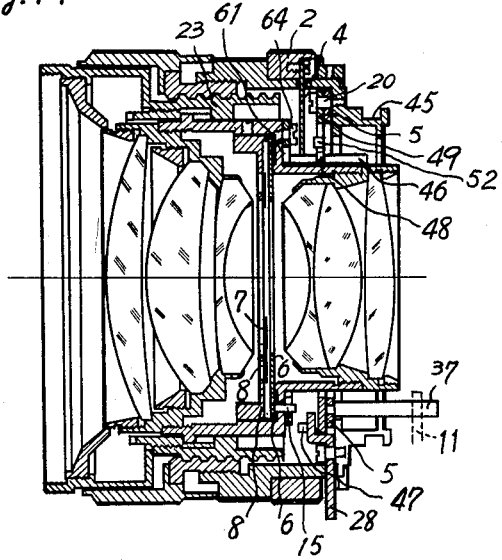
FIG. 19 is a detailed set-up sectional view of the mechanism shown in FIG. 18.

FIG. 19 is an assembled, sectional view of FIG. 18, in which both the overlapping lever 49 and diaphragm actuating lever 5 are pivoted with the shaft 20 on the side of lens cylinder, and both the overlapping lever 49 and diaphragm actuating lever 5 are mutually pulled by coil or wire formed springs 50 and are respectively stopped by pins 63 and 65. The arcuate lever 61 is pivoted by means of a pin 64 on the lens cylinder side, and the overlapping lever 49 is pushed forward by the pin 52 of lever 5, and further pushed forward by the limiting pin 46 engaged on one side of the groove 48.

In the construction referred to above, the cam plate 4 is moved in a large range by the diaphragm controlling ring 2. Since the direction of striking by the limiting pin 46 against the cam plate 4 is a radial direction against the center of rotation of the diaphragm controlling ring 2, that is, the direction of advancement of the displacing cam, (in the direction of a displacing cam, i.e. knocking from a right angle direction against a circular direction), a force for stopping the knocking force is strong. Therefore, it is strong against impact of the limiting pin 46. Furthermore, the diaphragm actuating pin 15 by means of the pin 52 and the limiting pin 46 have an enlarged movement provided by the movement of the diaphragm actuating lever 5, and the diaphragm actuating pin 15 is rotated in a circumferential direction by the arcuate intermediate lever 61.

Figure 20:
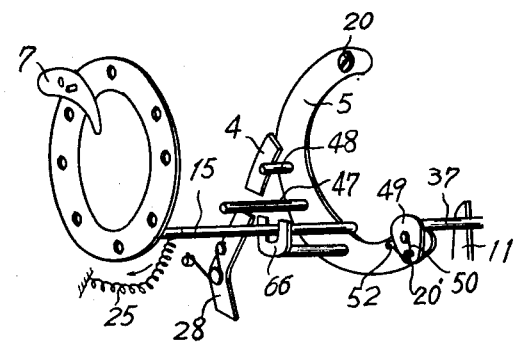
FIG. 20 is an exploded perspective view of a part of the mechanism shown in FIG. 12.

FIG. 20 is a further modification of FIG. 12 wherein the limiting pin 48 and the diaphragm releasing pin 47 are mounted on the diaphragm actuating lever 5 pivoted to the lens cylinder, and a fork lever 66 holding the diaphragm actuating pin 15 between its legs is provided. The engaging piece 37 is mounted on the overlapping lever 49 which contacts the pin 52 acting as a stopper; and which is connected with said diaphragm actuating lever by the spring 50. The function is similar as the preceding modification, but in view of the enlarged rate of the operational range of the diaphragm actuating pin 15, it is best applicable for an advancing lever 11 of a small operational range.

According to the present invention, the movement of an advancing lever reciprocating in connection with the diaphragm button on the side of the camera body is transmitted to the diaphragm actuating lever that is partially pivoted to the lens cylinder; by virtue of the overlapping lever overlapped with said diaphragm actuating lever, the diaphragm opening ring is driven to reduce the aperture of diaphragm blades on one hand and on the other hand to simultaneously strike against the cam plate formed as a stopper to regulate to a desired diaphragm value to limit the operation, thereby setting the diaphragm value by a desired diaphragm amount. As the construction of the important parts comprises pressed or stamped elements light in weight, it requires low cost in building. Because of an arcuate lever being used, the radius of revolution moment can be taken sufficiently large, and there occurs no losses in energy due to inertia; as impact and noise are remarkably low as compared with usual products, the use is cheerful, and the diaphragm effect can be confirmed at any suitable period of time, and moreover, even with exchange lens group having different focal lengths where the controlling diaphragm can be provided at a fixed position, it is advantageous for interlocking with electrical exposure meters.

What we claim is:

1. In a diaphragm device for a single lens reflex camera, the combination comprising an objective lens frame, a diaphragm controlling ring rotatably mounted around the outer periphery of said lens frame, a cam plate secured to said lens frame, a diaphragm controlling lever pivotally attached to said ring and having one end engaging said cam plate, a diaphragm actuating ring, diaphragm blade means carried by said actuating ring, a diaphragm actuating lever having one end operatively connected to said actuating ring and an opposite end pivotally attached to said lens frame, said actuating lever having an arcuate shape and being engaged by the opposite end of said diaphragm controlling lever, an interlocking lever having two positions and being operatively connected to said diaphragm actuating lever, and shutter means operatively connected to said interlocking lever whereby said diaphragm blade means is moved to an open state when said interlocking lever is moved to one of its positions as said shutter means is charged and said diaphragm blade means is automatically moved to a preset opening as said interlocking lever is moved to its other position prior to release of said shutter means.

2. The combination as recited in claim 1, wherein spring means normally biases said diaphragm actuating lever against the said opposite end of said diaphragm controlling lever.

3. The combination as recited in claim 2, wherein a second interlocking lever is operatively associated with the said first interlocking lever, and a preset lever operates said second interlocking lever.

4. The combination as recited in claim 2, wherein an advancing lever is operatively connected to said diaphragm actuating lever.

References Cited by the Examiner
UNITED STATES PATENTS

| | | | |
|---|---|---|---|
| 2,925,764 | 2/60 | Sauer | 95—42 X |
| 2,926,575 | 3/60 | Gebele | 95—42 |
| 2,971,446 | 2/61 | Noack | 95—42 |
| 3,081,680 | 3/63 | Goshima | 95—64 X |

NORTON ANSHER, *Primary Examiner.*

JOHN M. HORAN, EMIL G. ANDERSON, EVON C. BLUNK, *Examiners.*